Aug. 1, 1961     H. M. GUINOT     2,994,578
METHOD OF SELECTIVELY SEPARATING HYDROGEN SULPHIDE FROM GASES
CONTAINING HYDROGEN SULPHIDE AND CARBON DIOXIDE
Filed March 25, 1958
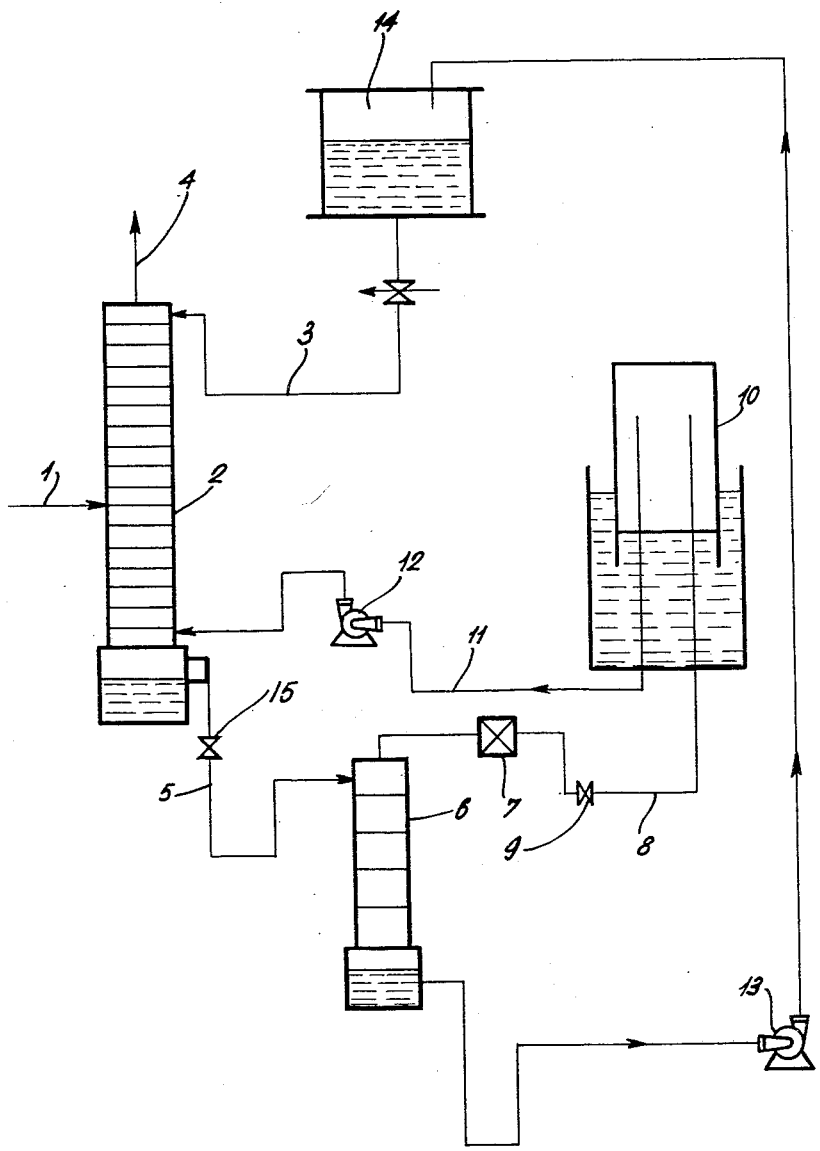
Inventor
Henri M. Guinot
by Stevens, Davis, Miller & Mosher
his attorneys

# United States Patent Office 2,994,578
Patented Aug. 1, 1961

2,994,578
METHOD OF SELECTIVELY SEPARATING HYDROGEN SULPHIDE FROM GASES CONTAINING HYDROGEN SULPHIDE AND CARBON DIOXIDE
Henri M. Guinot, Versailles, France, assignor of one-half to Societe pour l'Equipement des Industries, Chimiques-S.P.E.I.C.H.I.M.-Reunion des Anciens Établissements Barbet, Egrot & Grange, Pingris & Mollet-Fontaine, Paris, France, a company of France
Filed Mar. 25, 1958, Ser. No. 723,739
Claims priority, application France Apr. 4, 1957
6 Claims. (Cl. 23—2)

This invention relates to the purification of gases and more particularly to the separation of hydrogen sulphide and, if desired, carbon dioxide from gaseous mixtures containing the same.

In U.S. application Ser. No. 597,860 there is described a process for separating hydrogen sulphide from gases containing the same which comprises washing the gases with an aqueous solution of a metal salt which reacts with the hydrogen sulphide to form a hydrosulphide of the metal and which reacts with any carbon dioxide present to form a bicarbonate of the metal, and thereafter reducing the pressure on the wash liquor to cause liberation of the hydrogen sulphide and carbon dioxide and thus regenerate the initial washing solution.

In one form of the aforesaid process, the gas to be purified is brought into contact, preferably under pressure, with an aqueous solution of a salt such as dipotassium hydrogen phosphate in order to fix the hydrogen sulphide in the form of potassium hydrosulphide and, if necessary, the carbon dioxide in the form of bicarbonate. The dipotassium hydrogen phosphate is changed into the form of monopotassium dihydrogen phosphate. The solution thus obtained is thereafter expanded under a slight vacuum or under an atmosphere of inert gas, preferably with agitation and scavenging by an inert gas, in order to liberate the hydrogen sulphide and any carbon dioxide transitorily fixed, and to regenerate the initial aqueous solution.

It has now been discovered that if dipotassium hydrogen phosphate is employed in very concentrated aqueous solution, the carbon dioxide dissolves extremely slowly therein, while the dissolution of the hydrogen sulphide is only slightly retarded.

Similarly, when an attempt is made to produce the inverse desorption reaction by expansion under a slight vacuum or by scavenging with an inert gas, it is found that the carbon dioxide is eliminated from the solution at a very slow rate, whilst the hydrogen sulphide is readily expelled as usual, under otherwise equal conditions.

It is believed that the difference in the behaviour between the two gases can be explained by the necessity to allow the $CO_2$ to become hydrated in order that it may enter into reaction in the form of $H_2CO_3$, and conversely to allow the bicarbonate to return into the form of $H_2CO_3$ before liberating $CO_2$, coupled with the greatly reduced physical solubility due to the high concentration of the solution. On the other hand hydrogen sulphide can be combined directly without first having to become hydrated, and it is thus capable of reacting rapidly, subject to a sufficient agitation ensuring a good contact between the gaseous and liquid phases in equilibrium.

Whether the foregoing explanation is correct or not, and applicants do not wish to be considered as limited by the foregoing theory, the value of the phenomenon is illustrated by the following factual data:

It will be assumed that an aqueous solution of dipotassium phosphate, $K_2HPO_4$, contains 5 moles of salt per litre, i.e. about 835 g. per litre (density $d_4^{20}=1.82$). In this high concentration, the viscous liquor is capable of dissolving large quantities of $CO_2$, but it does so very slowly, contrary to what happens in the case of more dilute solutions.

Thus, at a temperature of 20° C. (or ambient temperature) and with a partial pressure of $CO_2$ of one atmosphere, 35 volumes of $CO_2$ are absorbed per volume of solution, but these conditions must be maintained for several hours with violent agitation in order to obtain this degree of saturation, which constitutes the true equilibrium between the liquid and gaseous phases under the conditions of the experiment.

On the other hand, by measuring the speeds of dissolution of $CO_2$ at the instant when the reaction starts, the following results are obtained with various concentrations of $K_2HPO_4$, the temperature being 20° C. (or ambient temperature) and the partial pressure of $CO_2$ being one atmosphere.

$K_2HPO_4$ concentration:

Solution of 1.5 mol. per litre
Saturation 10.5 vol./vol.
Rate of absorption 240 l. per hour at starting (for 1 litre of solution).
Solution of 2.5 mol. per litre
Saturation 17.1 vol./vol.
Rate of absorption at starting 270 l. per hour.
Solution of 5 mol. per litre
Saturation 35 vol./vol.
Rate of absorption at starting 24 l. per hour.

It will be seen that the rate of dissolution of $CO_2$ at starting was reduced eleven-fold when the concentration was doubled (from 2.5 mol. to 5 mol. per litre).

With hydrogen sulphide, the effects are very different. First of all, the quantity of $H_2S$ dissolved does not substantially vary with the concentration of the phosphate solution; thus 8 to 10 volumes of $H_2S$ are combined at 20° C. (or ambient temperature) and under partial pressure of 1 atmosphere. The following are the rates of dissolution at the start of the reaction under the same experimental conditions as in the case of $CO_2$:

| | Rate of absorption, litres per hour for 1 litre of solution |
|---|---|
| Solution 2.5 mol. of $K_2HPO_4$ per litre | 2.520 |
| Solution 3 mol. of $K_2HPO_4$ per litre | 2.520 |
| Solution 4 mol. of $K_2HPO_4$ per litre | 2.160 |
| Solution 5 mol. of $K_2HPO_4$ per litre | 1.800 |

It will therefore be seen that when the concentration of the phosphate solution is doubled, the rate of dissolution at the start is reduced only by 30%.

Finally, with a dipotassium hydrogen phosphate solution in a concentration of 5 moles per litre, the hydrogen sulphide dissolves about 75 times as fast as the $CO_2$. The $H_2S$ saturation of the liquor is complete in less than 1 minute with violent agitation.

In the desorption operation differences of the same order are observed between the respective behaviours of $H_2S$ and $CO_2$.

When subjected to violent agitation, a dipotassium hydrogen phosphate liquor charged with 35 vol./vol. of $CO_2$ loses only 1 vol./vol. despite blowing through with inert gas (600 vol./vol.) for a working duration of 1 hour.

The same liquor saturated with 9.8 vol./vol. of $H_2S$ loses 8.3 vol./vol. of this gas (i.e. 85%), with blowing through of inert gas (60 vol./vol.) for a working period of 6 minutes.

Finally, it is observed that a current of $H_2S$ passed through a dipotassium hydrogen phosphate solution saturated with $CO_2$ is capable of displacing the latter, and vice versa.

According to the present invention, therefore, a process of treating a gas containing both hydrogen sulphide and carbon dioxide for the purpose of the selective or substantially selective separation of hydrogen sulphide therefrom comprises feeding in counter-current to the gas to be treated an aqueous dipotassium hydrogen phosphate solution containing at least 2 gram-molecules of said salt per litre and adjusting the respective rates of flow of the gas and of the solution, as the length of the contact path, so that the solution leaving the treatment zone retains substantially all the hydrogen sulphide contained in the gas.

It is convenient to cause the solution to descend in a stream or in drops through a rising current of the gas to be treated and/or to bubble the latter through successive thin layers of solution gradually fed as in a plate column.

It is thus possible to bring a given volume of gas into contact with sufficient of the above-defined solution for all the hydrogen sulphide to be retained, and to prevent contact of the solution with the gas when it has combined all the hydrogen sulphide.

It is advantageous to employ an aqueous solution containing about 5 gram-molecules of dipotassium phosphate per litre.

By virtue of this procedure, a solution which has combined much less $CO_2$ than $H_2S$ is obtained after the contacting operation.

In order to recover the hydrogen sulphide thus combined by the dipotassium hydrogen phosphate solution, it is then sufficient to subject it to a reduced pressure while constantly renewing the free surface, for example by agitation or division into streams or drops, and/or to subject it to the scavenging action of an inert gas until all or substantially all the hydrogen sulphide has been liberated, but without reaching the stage of an appreciable liberation of any retained carbon dioxide.

It has been found advantageous, after the gas has been brought into contact with the aqueous solution, to introduce into the solution containing potassium hydrosulphide and potassium bicarbonate, hydrogen sulphide in a quantity such as to displace the greater part of the carbon dioxide retained in the form of bicarbonate, so that the hydrogen sulphide thus introduced is in turn combined without being liberated to an appreciable degree and drives off the carbon dioxide.

In carrying out the process according to the present invention, there may be employed with advantage a bubble plate column or a packed tower, through the top of which the aqueous dipotassium hydrogen phosphate solution is admitted while the gas to be treated is admitted through the centre part, so as to maintain below the point of introduction a zone corresponding to the drawing-off zone of the usual type distillation column. It is into the latter zone, preferably at its base, that a portion of the hydrogen sulphide extracted after desorption may be introduced as an agent for the displacement of any carbon dioxide which may have entered into solution.

It is nevertheless possible within the scope of the invention to effect this introduction of hydrogen sulphide into a separate decarbonating zone downstream of the column or tower and upstream of the zone for the recovery of the hydrogen sulphide.

The mean period of contact between the gas to be treated, when its $H_2S$ and $CO_2$ content are each of the order of a few percent, and the dipotassium hydrogen phosphate solution may be from several seconds to one minute.

The gas to be treated may have relatively low $H_2S$ and $CO_2$ contents or higher contents and may even be a mixture consisting solely of $H_2S$ and $CO_2$.

The dipotassium hydrogen phosphate solution may be an aqueous solution of tetrapotassium pyrophosphate containing dipotassium hydrogen phosphate as product of hydrolysis.

The initial treatment may be effected under superatmospheric pressure.

The following example will serve to illustrate the invention; it is described in relation to the accompanying drawing:

*Example*

The gas to be purified contains 5% of $H_2S$ and 8% of $CO_2$, of which only the hydrogen sulphide is to be eliminated.

The gas, available at a pressure of 20 kg./cm.$^2$, is passed through a pipe 1 into the central part of a plate-type or socked column 2, at the top of which there arrives through a pipe 3 an aqueous dipotassium hydrogen phosphate solution containing 5 gram-molecules of said salt per litre, in a proportion of 15 litres per cubic metre of gas. This solution is capable of dissolving 9 vol./vol. of $H_2S$ for a partial pressure of 1 atmosphere.

The solution flowing to the bottom of the column encounters the gas circulating in the opposite direction and tends to dissolve preferentially the $H_2S$. The flow of liquid is accordingly adjusted to obtain a total dissolution. The gas freed from $H_2S$ leaves through a pipe 4.

A small quantity of $CO_2$ passes into solution at the same time and the liquid charged with impurities flows towards the bottom part of the column, whence it is expanded through a valve 15 and introduced through the pipe 5 at the top of a column 6, in which it is subjected to the action of a vacuum pump 7 so as to effect the desorption of the $H_2S$ gas carried along in the solution. This gas is passed through a pipe 5 provided with a valve 9 into a gas-holder 10. From here, a portion representing about 85 litres per cubic metre of treated gas is introduced into the bottom of the column 2 through a pipe 11 under the action of a compressor 12 in order to force the greater part of the $CO_2$ carried along in the solution towards the upper part of the column.

The liquid freed from the gas which it contained and flowing from the bottom of the column 6, is taken up by a pump 13 and passed through a feed tank 14 in order to be re-used (pipe 3).

The liquor thus regenerated may without disadvantage contain small quantities of potassium bicarbonate by reason of the difficulty experienced in completely driving off the $CO_2$ from the solution, which permits of obtaining a relatively pure hydrogen sulphide despite the presence of the said $CO_2$. Nevertheless, if it is desired to obtain hydrogen sulphide completely free from $CO_2$, the liquor withdrawn from the column 6 may be completely or partly heated, for example in an additional column, so as to free it from $CO_2$ before it is fed to the tank 14.

I claim:

1. A process for the selective separation of hydrogen sulphide from a gaseous mixture containing hydrogen sulfide and carbon dioxide which comprises feeding in countercurrent to the said gaseous mixture an aqueous solution of dipotassium hydrogen phosphate of concentration about 5 g. mol. of said salt per litre and adjusting the rates of flow and contact path so that the solution leaving the treatment zone has absorbed substantially all the hydrogen sulphide in the gas, all of the above steps being conducted at ambient temperatures.

2. In a process for the selective separation of hydrogen sulphide from a gaseous mixture containing hydrogen sulfide and carbon dioxide, the steps of passing said gas mixture countercurrently to an aqueous solution of dipotassium hydrogen phosphate of concentration about 5 g. mol. of said phosphate per litre in a treatment zone; adjusting the rates of flow and contact path so that the solution leaving said treatment zone has absorbed substantially all the hydrogen sulphide in said gaseous mixture; and thereafter subjecting the solution leaving said treatment zone to reduced pressure and vigorous agitation, to liberate hydrogen sulphide therefrom, all of the above steps being conducted at ambient temperatures.

3. In a process for the selective separation of hydrogen sulphide from a gaseous mixture containing hydrogen sulfide and carbon dioxide, the steps of passing said gas mixture countercurrently to an aqueous solution of dipotassium hydrogen phosphate of concentration about 5 g. mol. of said phosphate per litre in a treatment zone; adjusting the rates of flow and contact path so that the solution leaving said treatment zone has absorbed substantially all the hydrogen sulphide in said gaseous mixture; and thereafter subjecting the solution leaving said treatment zone to reduced pressure while flushing an inert gas therethrough to entrain hydrogen sulphide liberated therefrom, all the above steps being conducted at ambient temperatures.

4. In a process for the selective separation of hydrogen sulphide from a gaseous mixture containing hydrogen sulfide and carbon dioxide, the steps of passing said gas mixture countercurrently to an aqueous solution of dipotassium hydrogen phosphate of concentration about 5 g. mol. of said phosphate per litre in a treatment zone; adjusting the rates of flow and contact path so that the solution leaving said treatment zone has absorbed substantially all the hydrogen sulphide in said gaseous mixture; thereafter subjecting the solution leaving said treatment zone to reduced pressure and vigorous agitation to liberate hydrogen sulphide therefrom; and introducing hydrogen sulphide into said treatment zone at a point adjacent the location where said solution leaves said treatment zone so as to remove from said solution any carbon dioxide contained therein.

5. In a process for the selective separation of hydrogen sulphide from a gaseous mixture containing hydrogen sulfide and carbon dioxide, the steps of passing said gas mixture countercurrently to an aqueous solution of dipotassium hydrogen phosphate of concentration about 5 g. mol. of said phosphate per litre in a treatment zone; adjusting the rates of flow and contact path so that the solution leaving said treatment zone has absorbed substantially all the hydrogen sulphide in said gaseous mixture; thereafter subjecting the solution leaving said treatment zone to reduced pressure while flushing an inert gas therethrough to entrain hydrogen sulphide liberated therefrom; and introducing hydrogen sulphide into said treatment zone at a point adjacent the location where said solution leaves said treatment zone so as to remove from said solution any carbon dioxide contained therein.

6. In a process for the selective separation of hydrogen sulphide from a gaseous mixture containing hydrogen sulfide and carbon dioxide, the steps of passing an aqueous solution of dipotassium hydrogen phosphate of concentration about 5 g. mol. of said phosphate per litre, downwardly through a vertical treatment zone from the top portion thereof; feeding said gaseous mixture to a midpoint of said zone; adjusting the ratios of feed and length of treatment zone so that the solution leaving the bottom of said treatment zone has absorbed substantially all the hydrogen sulphide from said gaseous mixture; subjecting said solution leaving said treatment zone to reduced pressure and recovering hydrogen sulphide therefrom; and introducing a portion of the hydrogen sulphide thus recovered into said treatment zone at a point below the point of introduction of said gaseous mixture, all of the above steps being conducted at ambient temperatures.

References Cited in the file of this patent

UNITED STATES PATENTS

| | | |
|---|---|---|
| 491,365 | Luhmann | Feb. 7, 1893 |
| 2,110,403 | Rosenstein | Mar. 8, 1938 |
| 2,318,522 | Powell | May 4, 1943 |